United States Patent
Kozko

(10) Patent No.: US 9,633,187 B1
(45) Date of Patent: Apr. 25, 2017

(54) SELF-PHOTOGRAPH VERIFICATION FOR COMMUNICATION AND CONTENT ACCESS

(71) Applicant: Dmitry Kozko, Aventura, FL (US)

(72) Inventor: Dmitry Kozko, Aventura, FL (US)

( * ) Notice: Subject to any disclaimer, the term of this patent is extended or adjusted under 35 U.S.C. 154(b) by 0 days.

(21) Appl. No.: 14/983,872

(22) Filed: Dec. 30, 2015

(51) Int. Cl.
*G06K 9/00* (2006.01)
*G06F 21/32* (2013.01)

(52) U.S. Cl.
CPC ......... *G06F 21/32* (2013.01); *G06K 9/00255* (2013.01); *G06K 9/00288* (2013.01)

(58) Field of Classification Search
CPC ............ G06T 5/50; G06T 2207/30201; G06K 9/00221; G06K 9/00885
See application file for complete search history.

(56) References Cited

U.S. PATENT DOCUMENTS

| | | | | |
|---|---|---|---|---|
| 8,549,590 | B1 * | 10/2013 | de Villiers Prichard | G06Q 10/10 713/161 |
| 9,131,339 | B1 * | 9/2015 | Kulfan | H04W 4/02 |
| 2008/0051033 | A1 * | 2/2008 | Hymes | G06F 17/30247 455/47 |
| 2010/0325218 | A1 * | 12/2010 | Castro | G06Q 50/01 709/206 |
| 2011/0211737 | A1 * | 9/2011 | Krupka | G06F 17/30247 382/118 |
| 2013/0117692 | A1 * | 5/2013 | Padmanabhan | H04N 21/4126 715/753 |
| 2013/0160141 | A1 * | 6/2013 | Tseng | G06F 21/6245 726/28 |
| 2014/0085460 | A1 * | 3/2014 | Park | G06F 21/84 348/135 |
| 2014/0157371 | A1 * | 6/2014 | Le Chevalier | G06F 17/30563 726/4 |
| 2015/0020151 | A1 * | 1/2015 | Ramanathan | G06F 21/6218 726/1 |
| 2015/0381614 | A1 * | 12/2015 | Hildreth | H04W 4/206 726/7 |

OTHER PUBLICATIONS

Chrsitin et al. "A Picture is Worth a Thousand Words:Privacy-aware and Intuitive Relationship Establishmentin Online Social Networks", Jun. 12, 2011, Third International Workshop on Security and Privacy in Spontaneous Interaction and Mobile Phone Use (IWSSI/SPMU), pp. 1-6.*
Kim et al., "Social Authentication: Harder Than It Looks", 2012, A.D. Keromytis (Ed.): FC 2012, LNCS 7397, pp. 1-15.*

* cited by examiner

*Primary Examiner* — Vu Le
*Assistant Examiner* — Guillermo Rivera-Martinez
(74) *Attorney, Agent, or Firm* — Patents on Demand P.A.; Brian K. Buchheit; Scott M. Garrett

(57) ABSTRACT

A content access request from a first computing device for a digital content can be received. The content associated with request can be a digital content associated with a second computing device. A facial biometric identification challenge can be conveyed to the first computing device. The conveying can trigger the capture of a digital self-portrait photograph of a portion of a face of a user associated with the first computing device. A facial biometric of the face of a user within the digital self-portrait photograph can be compared to facial features of human faces within historic digital media associated with a different user. When the facial biometric matches a facial biometric within historic digital media, the digital content associated with the content access request can be conveyed to the first computing device.

15 Claims, 4 Drawing Sheets

SELF-PHOTOGRAPH VERIFICATION FOR COMMUNICATION AND CONTENT ACCESS

BACKGROUND

The present invention relates to the field of computer security and, more particularly, to self-photograph verification for communication and content access.

In today's connected world, users can be inundated with a flurry of communication. Many times, communication can be from friends, family, co-workers and even businesses. Frequently, users are bombarded with inappropriate messages or messages from strangers. It is not uncommon for users to receive cryptic and/or unusual messages from strangers on social media websites. In many instances, users can have difficulty configuring their social media profiles to effectively bar these seemingly random communications. As a result, users are constantly forced to manually filter their message inbox. What is needed is a mechanism to easily aid users in controlling which messages and/or communications which reach them.

BRIEF SUMMARY

One aspect of the present invention can include a system, a computing program product, and a method for self-photograph verification for communication and content access. A content access request from a first computing device for a digital content can be received. The content associated with request can be a digital content associated with a second computing device. A facial biometric identification challenge to the first computing device. The conveying can trigger the capture of a digital self-portrait photograph of a portion of a face of a user associated with the first computing device. A facial biometric of the face of a user within the digital self-portrait photograph can be compared to facial features of human faces within historic digital media associated with a different user. When the facial biometric matches a facial biometric within historic digital media, the digital content associated with the content access request can be conveyed to the first computing device.

Another aspect of the present invention can include a system, a computing program product, and a method for self-photograph verification for communication and content access. A social media action initiated within a social network platform can be detected. The action can be performed by a first user attempting to interact with a second user. The first user can be prompted for a self-portrait photograph prior to initiating the social media action. A user identity of the first user can be determined utilizing facial biometrics obtained from the self-portrait photograph. When a previously established endorsement value associated with the user identity is greater than historically determined threshold value the social media action can be completed.

Yet another aspect of the present invention can include a method, a computing program product, and a system for self-photograph verification for communication and content access. An endorsement engine can be configured to permit communication between a first user and a second user based on the frequency of presence of the first and second user within a set of historic digital media. The frequency of presence can be utilized to determine a portion of an endorsement value associated with the first user. The endorsement value can be associated with the first user and can be persisted within an endorsement list associated with the second user. A data store can be configured to persist a set of historic digital media and an endorsement list.

DETAILED DESCRIPTION

Figure 1A:
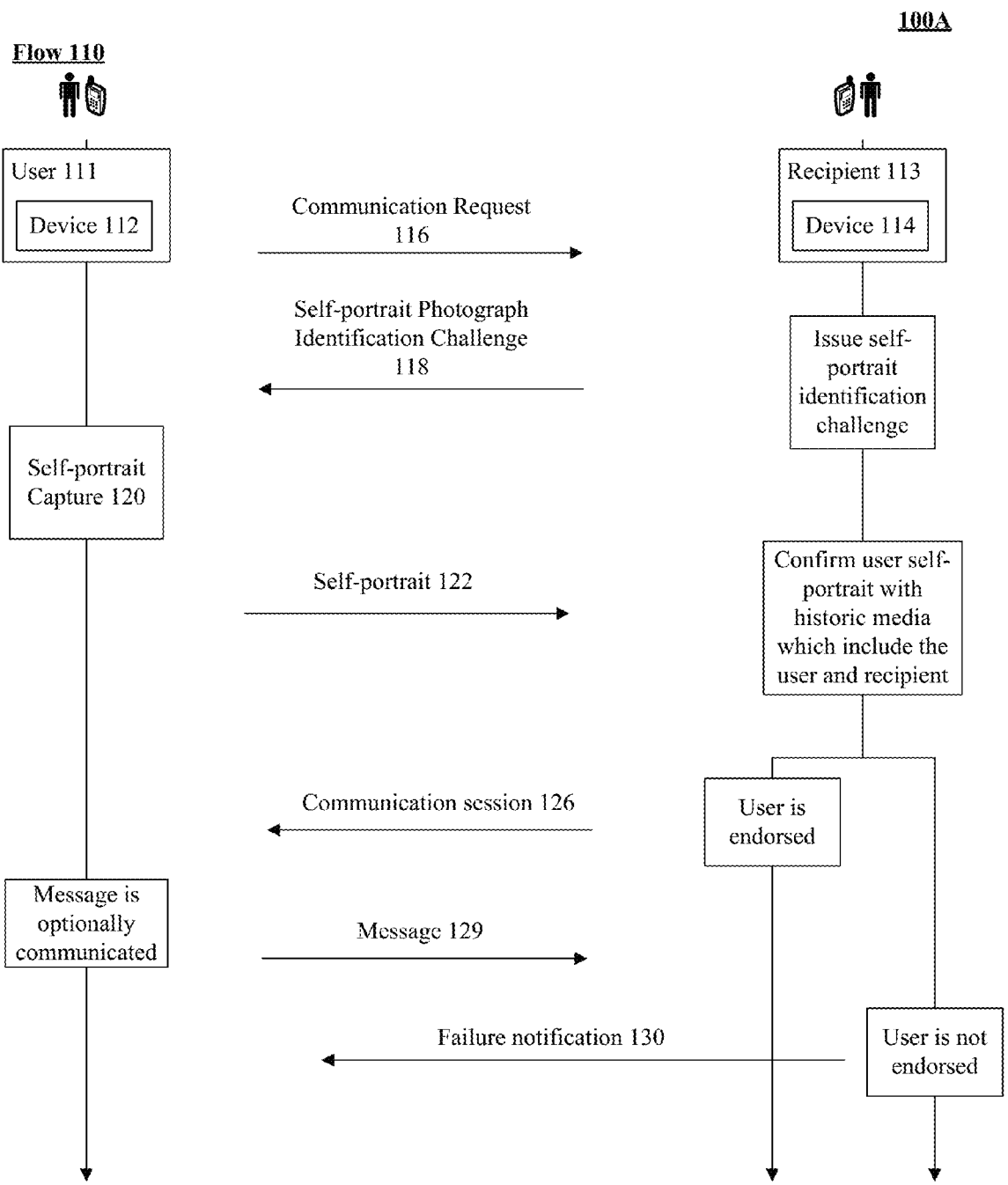
FIG. 1A is a schematic diagram illustrating a flow for self-photograph verification for communication and content access in accordance with an embodiment of the inventive arrangements disclosed herein.

The present disclosure is a solution for self-photograph verification for communication and content access. In the solution, a communication or content request can be initiated by a sending computing device. In one embodiment, the recipient computing device of the request can trigger a self-photograph facial verification challenge. In the embodiment, the verification challenge can prompt a user associated with the sending computing device to capture a self-photograph of the user's face. For example, a selfie photograph of the user's face can be captured and conveyed to the recipient computing device. In one instance, the facial biometrics of the self-photograph can be compared to historic digital media with a different user associated with the recipient computing device to determine the presence of the user in the digital media of the different user. That is, if the different user and the user have taken photographs together then the verification can succeed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A is a schematic diagram illustrating a flow 110 for self-photograph verification for communication and content access in accordance with an embodiment of the inventive arrangements disclosed herein. Flow 110 can be performed in the context of embodiments 150, 170, method 200 and/or system 300. It should be understood that flow 110 can utilize one or more embodiments 150, 170 to perform endorsement checking. Embodiments 150, 170 can represent exemplary mechanisms for performing endorsement checking and/or verification and the disclosure is not limited to the specifics of the embodiments 150, 170.

In flow 110, a user 111 can utilize a device 112 to communicate with recipient 113 via device 114 when the user 111 is endorsed. In one instance, user 111 can be endorsed by determining a shared digital media in which both the user 111 and the recipient 113 are present. In the instance, when both the user 111 and the recipient 113 are detected (e.g., via facial recognition) to be present in the same digital media (e.g., photograph), the user 111 can be automatically endorsed. Endorsement can permit communication between devices 112, 114 and thus interaction between user 111, recipient 113. It should be appreciated that endorsement can leverage social conventions to automatically verify a user 111 has previously interacted with recipient 113 in the real world. That is, when interaction occurs in the real world, a personal or business relationship between the user 111, recipient 113 can be inferred based on a shared presence within a photograph or video. For example, when a user 111 and recipient 113 have taken a picture together, the user 111 can be endorsed.

In flow 110, a communication request 116 can be conveyed from device 112 to device 114. For example, a user 111 can attempt to communicate with recipient 113 within a social media platform such as LinkedIn. Communication request 116 can conform to traditional and/or proprietary communications. Communications can include, but is not limited to, a text exchange, a Voice over Internet Protocol communication, a Short Message Service message, and the like. Upon receiving communication request 116, device 114 can issue a self-portrait identification challenge 118. In one instance, the challenge 118 can trigger a self-portrait capture to be manually and/or automatically performed 120. For example, upon receiving challenge 118, a camera application can be executed which can allow a user 111 to manually capture a self-portrait. In one instance, self-portrait 122 can be analyzed to determine when a suitable self-portrait is captured. In the instance, analysis can leverage facial biometrics to establish when a face 160 of user 111 is present in the self-portrait. For example, when a self-portrait only includes half of the face 160 of the user 111, the portrait 122 can be automatically rejected and the user 111 can be prompted to capture a new self-portrait.

Once a suitable self-portrait 122 is captured, the self-portrait can analyzed to determine the presence of the face 160 within historic images where the recipient 113 and the user 111 are both present. For example, when a photograph in which both the user 111 and the recipient 113 are present is detected, communication to be permitted and when no photograph is found with both the user 111 and the recipient 113, communication can be disallowed.

When the user 111 is endorsed a communication session 126 can be established between the device 112, 114. In one embodiment a message 129 ca be optionally communicated to device 114 from device 112. It should be appreciated that communication session can conform to traditional and/or proprietary conventions.

In one instance, a notification can be communicated to recipient 113 to indicate a communication is initiated from user 111. In the instance, the notification can identify user 111, present self-portrait 120, additional information about user 111, and the like. For example, notification can present a dialog with a note: "User D is attempting to contact you. User D is endorsed (present in 5 of your pictures)".

In one embodiment, text exchange messages can be communicated within session 126. For example, a message can be sent from a FACEBOOK recipient 113 outside the social network of the user 111 when the recipient 113 and user 111 appear in the same picture on the recipient's FACEBOOK wall.

When the user 111 is not endorsed (e.g., lacks presence in recipients photos), a failure notification 130 can be presented within an interface of device 112. For example, the user 111 can be notified that they are not known to the recipient and therefore cannot communicate with the recipient. In one embodiment, a manual override for the functionality in flow 110 can be accessible to recipient 113. In the embodiment, recipient 113 can be notified that user 111 is attempting contact and an option for permitting contact can be presented.

Figure 1B:
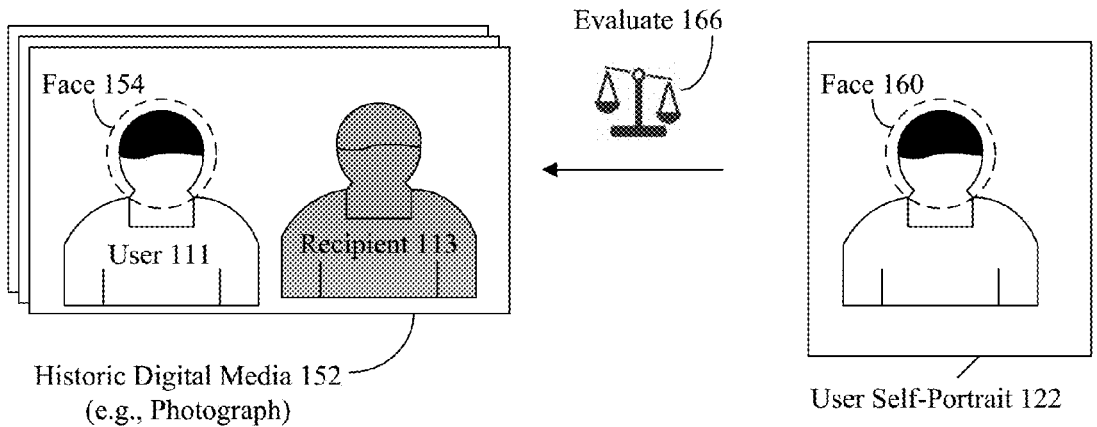
FIG. 1B is a schematic diagram illustrating a set of embodiments for self-photograph verification for communication and content access in accordance with an embodiment of the inventive arrangements disclosed herein.
Figure 1B:
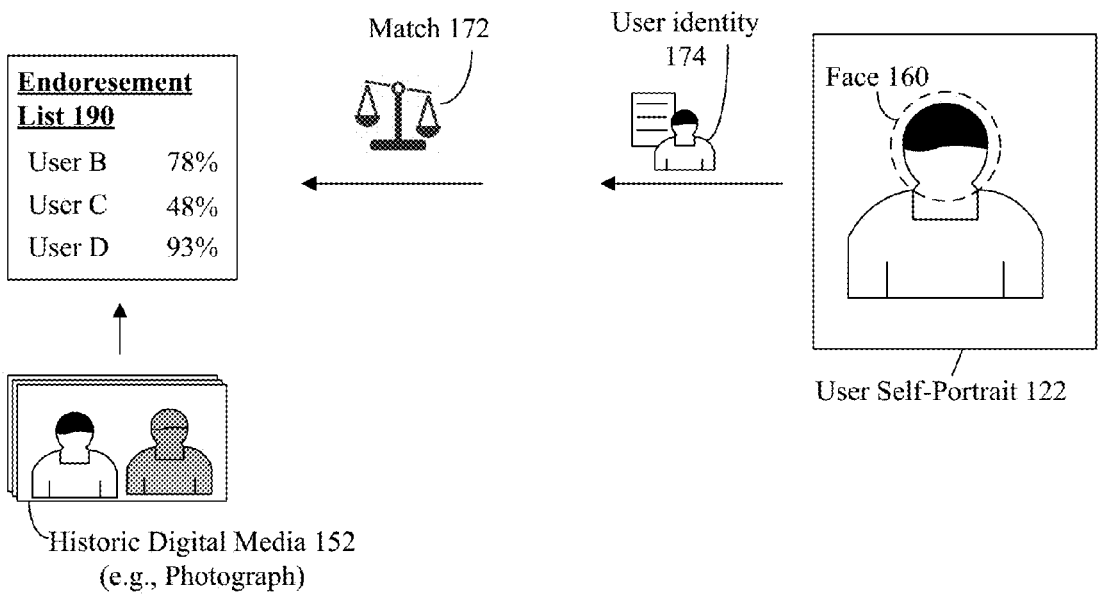

FIG. 1B is a schematic diagram illustrating a set of embodiments 150, 170 for self-photograph verification for communication and content access in accordance with an embodiment of the inventive arrangements disclosed herein. Embodiments 150, 170 permit user endorsement checking utilizing dynamic analysis (e.g., real-time) and historic analysis (e.g., non real-time). Embodiments 150, 170, can be performed in the context of flow 110, method 200 and/or system 300.

In embodiment 150, a historic digital media associated with a recipient 113 can be identified. In the embodiment, a user self-portrait 122 can be evaluated to determine the face 160 of user 111 matches that of a face 154 within media 152. In one instance, facial biometrics can be collected from both media 152 and self-portrait 122. In the instance, biometrics can be compared to determine if the biometrics of self-portrait 122 matches biometrics of one or more media 152.

In embodiment 170, an endorsement list 190 can be generated from historic digital media 152. In one embodiment, facial recognition can be utilized to determine user identity 174 of persons within media 152. In one instance, the list 190 can be dynamically generated and/or updated in real-time or near real-time, enabling the disclosure to be adaptive. For example, when a recipient 113 adds a picture with both the user 111 and the recipient, list 190 can be updated. In one embodiment, list 190 can include weighted values which can be utilized to customize content access and/or communication permissions associated with a recipient 113. In one instance, face 160 can be analyzed to determine a user identity 174 which can be matched 172 against an endorsement list 190. It should be appreciated that the disclosure can be arbitrarily complex and can permit any programmatic action to be performed responsive to the match 172. For example, when match 174 fails, a user 111 can be automatically added to a blocked list of the recipient 113.

Drawings presented herein are for illustrative purposes only and should not be construed to limit the invention in any regard. It should be appreciated that the disclosure can leverage media metadata, social media metadata (e.g., user tagging), and the like to obtain user identity 174. In one instance, media 152 can include video, images, slideshow media, and the like. In one instance, media 152 can be remotely and/or locally situated from device 114. In the instance, media 152 can include media persisted within a distributed computing network, a hard drive, a memory card, and the like. For example, media 152 can include videos in FACEBOOK albums and local pictures stored within a mobile phone.

It should be appreciated that compare 166 can an arbitrarily complex functionality and can provide partial matches which can be manually verified by recipient 113.

Figure 2:
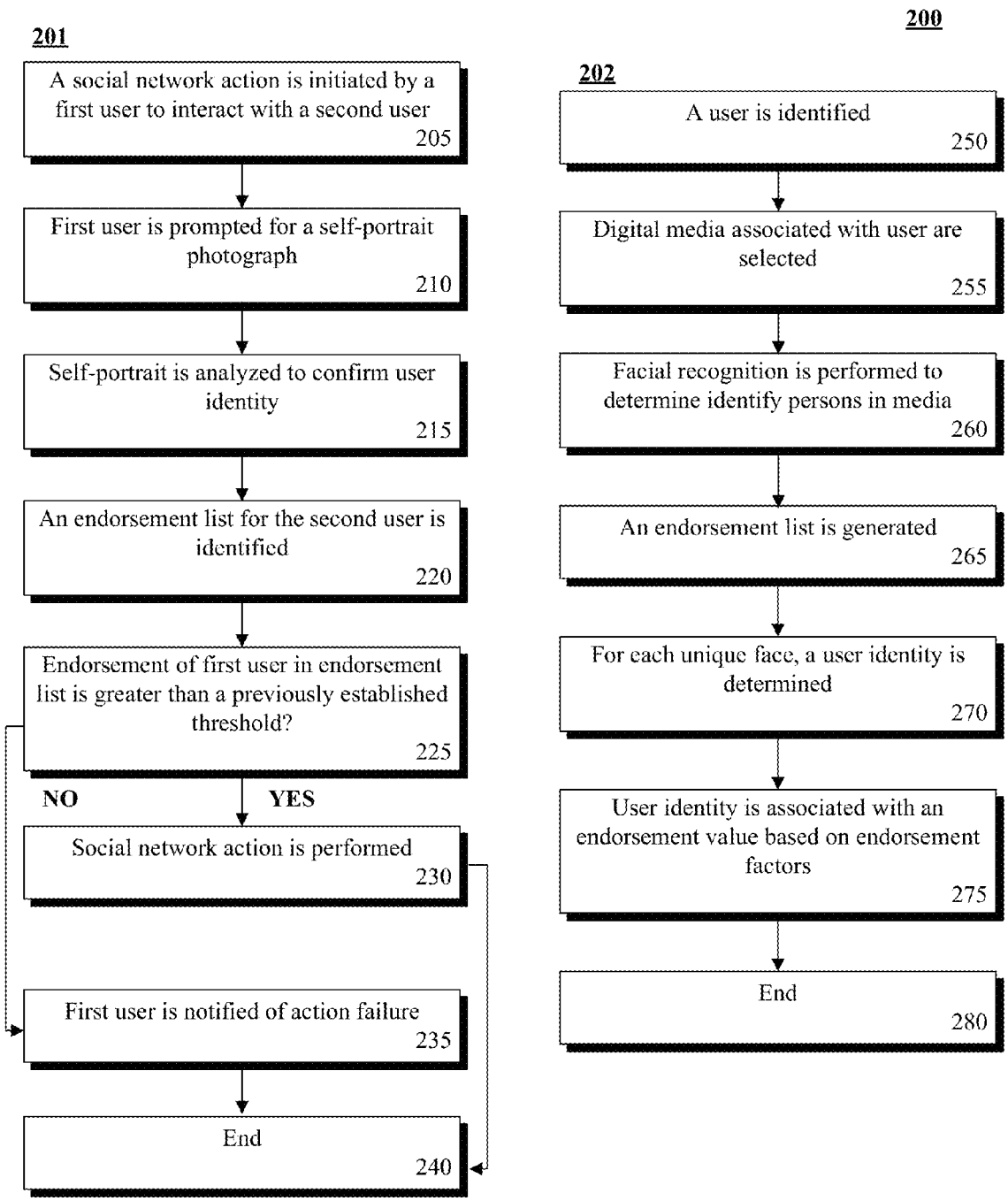
FIG. 2 is a flowchart illustrating a method for self-photograph verification for communication and content access in accordance with an embodiment of the inventive arrangements disclosed herein.

FIG. 2 is a flowchart illustrating a method 200 for self-photograph verification for communication and content access in accordance with an embodiment of the inventive arrangements disclosed herein. Method 200 can be performed in the context of flow 110 embodiments 150, 170, and/or system 300.

In method 201, an endorsement list can permit social network filtering for communications and content access. In step 205, a social network action can be initiated by a first user to interact with a second user. Social network action can include, but is not limited to, message exchange, profile access, skill endorsement (e.g., LinkedIn endorsements), and the like. In step 210, the first user can be prompted for a self-portrait photograph. In step 215, the self-portrait photograph can be analyzed to confirm user identity. In step 220, an endorsement list for the second user can be identified. In step 225, if the endorsement of the first user in the endorsement list is greater than a previously established threshold, then the method can continue to step 230, else proceed to step 235. In one embodiment, threshold can be manually and/or automatically established. In one instance, the threshold can be established based on security settings of a user account within a social network platform. In step 230, the social network action can be performed. In step 235, a first user can be notified of action failure. In step 240, the method can end.

In method 202, an endorsement list can be generated from historic digital media to permit social network filtering for communications and content access.

In step 250, a user can be identified. In step 255, a historic digital media associated with the user can be selected. In step 260, a facial recognition can be performed to determine user identity of persons in media. In step 265, an endorsement list can be generated. In step 270, for each unique face a user identity can be determined. In step 275, user identity can be associated with an endorsement value based on endorsement factors. Endorsement factors can include, presence frequency, presence currency (e.g., old picture versus new picture), and the like. Factors can be arbitrarily complex and can be utilized to facilitate weighting values associated with user identities. In step 280, the method can end.

Drawings presented herein are for illustrative purposes only and should not be construed to limit the invention in any regard. Method 201, 202 can be performed in real-time or near real-time. Method 201, 202 steps can be performed in serial and/or in parallel.

Figure 3:
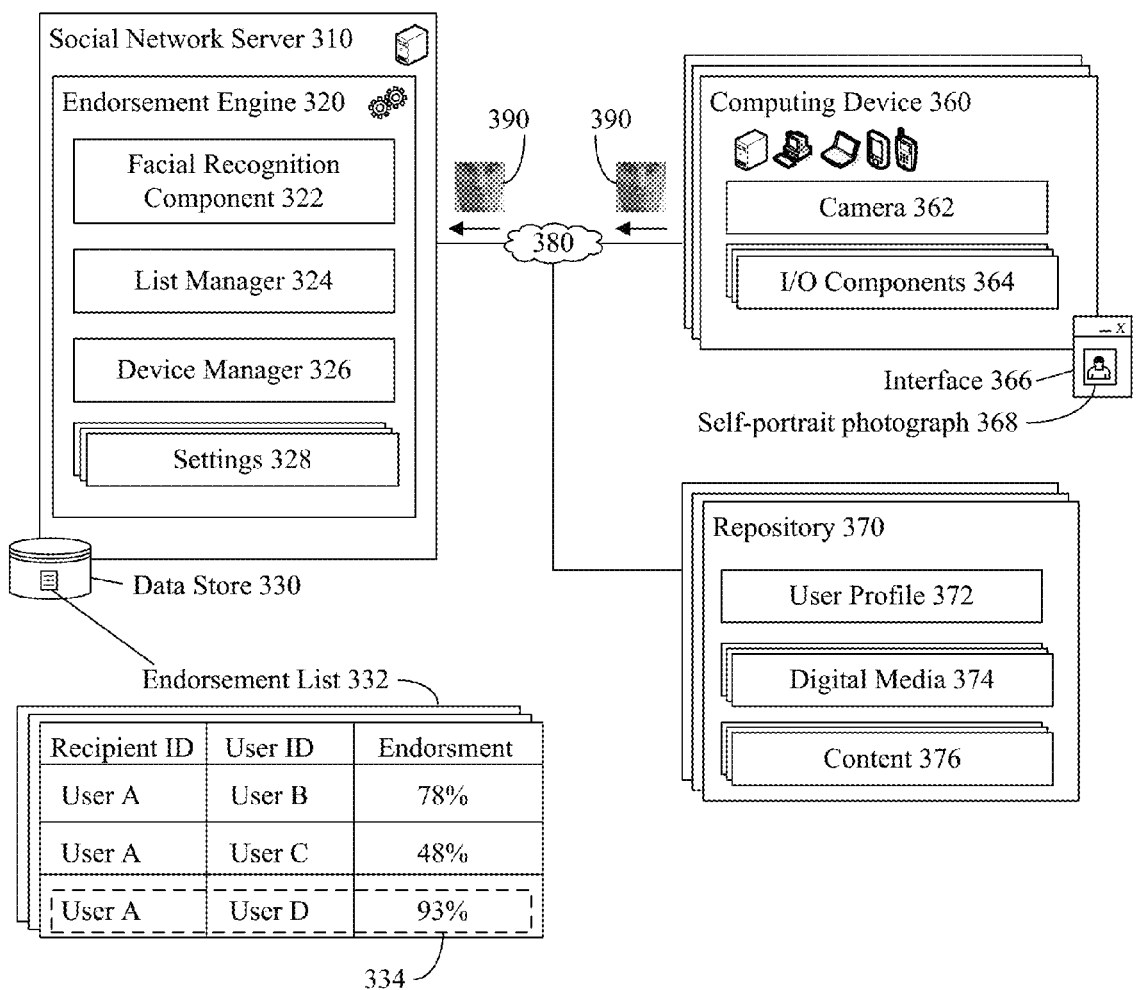
FIG. 3 is a schematic diagram illustrating a system for self-photograph verification for communication and content access in accordance with an embodiment of the inventive arrangements disclosed herein.

FIG. 3 is a schematic diagram illustrating a system 300 for self-photograph verification for communication and content access in accordance with an embodiment of the inventive arrangements disclosed herein. System 300 can be performed in the context of flow 110 embodiments 150, 170, and/or method 200. System 300 components can be communicatively linked via one or more wired and/or wireless networks 380. In the system 300, a facial biometrics 390 can be obtained from a self-portrait photograph 368 prior to initiating a communication exchange between two or more users via devices 360.

Social network server 310 can be a hardware/software entity for executing endorsement engine 320. Server 310 functionality can include, but is not limited to, load balancing, file sharing, Web based services, and the like. Server 310 can include, but is not limited to endorsement engine 310, data store 330, and the like. In one instance, server 310 can be a component of a distributed social networking platform. For example, server 310 can be a server device of a LINKEDIN platform or INSTAGRAM platform. In one embodiment, server 310 can include repository 370 and/or repository 370 data sets.

Endorsement engine 320 can be a hardware/software element for permitting endorsement based communication filtering for social networking platforms. Engine 320 functionality can include, but is not limited to, profile 372 creation, media 374 sharing, spoofing detection, notification generation, notification delivery, and the like. In one instance, engine 320 can be a component of a distributed computing environment. In another instance, engine 320 functionality can be a capability of an Application Programming Interface (API). In one instance, engine 320 can perform conflict resolution functionality when facial biometrics match with against more than one user identity or vice versa. In the instance, conflict resolution can be manually performed via user intervention or can be automatically performed utilizing conflict resolution settings (e.g., manually and/or automatically established).

Facial recognition component 322 can be a hardware/software entity for detecting facial biometrics associated with a self-portrait photograph and/or digital media. Component 322 functionality can include, but is not limited to, facial recognition, facial tracking, and the like. In one instance, component 322 can utilize traditional and/or proprietary recognition mechanisms. In the instance, mechanisms can include, but is not limited to, Principal Component Analysis using eigenfaces, Linear Discriminate Analysis, Elastic Bunch Graph Matching using the Fisherface algorithm, the Hidden Markov model, the Multilinear Subspace Learning using tensor representation, neuronal motivated dynamic link matching, and the like.

List manager 324 can be a hardware/software element for generating, modifying, and/or persisting list 332. Manager 324 functionality can include, but is not limited to, list 332 presentation, list exporting/importing, and the like. Manager 324 can enable customized settings, security policy creation, and the like. In one instance, manager 324 can permit integration of endorsement list 332 with existing social network security settings.

Device manager 326 can be a hardware/software entity for managing devices 360 to enable endorsement based filtering. Manager 326 functionality can include, but is not limited to, device 360 registration, user identity association, and the like. In one embodiment, manager 326 can be a functionality of an administrative functionality.

Settings 328 can be one or more options for configuring the behavior of system 300 and/or system 300 components. Settings 328 can include, but is not limited to, facial recognition component 322 settings, list manager 324 options, device manager 326 settings, and the like. In one instance, settings 328 can be manually and/or automatically established. In one embodiment, settings 328 can be presented within interface 366, server 310 interface, and the like.

Data store 330 can be a hardware/software component able to persist user profile 372, settings 328, media 374, and the like. Data store 330 can be a Storage Area Network (SAN), Network Attached Storage (NAS), and the like. Data store 330 can conform to a relational database management system (RDBMS), object oriented database management system (OODBMS), and the like. Data store 330 can be communicatively linked to server 310 in one or more traditional and/or proprietary mechanisms. In one instance, data store 330 can be a component of Structured Query Language (SQL) complaint database.

Endorsement list 332 can be one or more data sets for enabling endorsement based filtering. List 332 can include, but is not limited to, a user identity, a recipient identity, a user identity, an endorsement value, and the like. For example, list 332 can create an endorsement list to associate users (e.g., User B, User C, User D) of a recipient's (e.g., User A) social network with an endorsement value (e.g., 93%) based on how many times the user and the recipient appear in recipients social media albums/photographs. In one embodiment, entry 334 can link the user of a recipient's social network to an endorsement value. In one instance, endorsement value can be utilized to allowed tiered access to content 376 and/or communication. In the instance, endorsement value can be a numerical value, (e.g., percentage) which can be evaluated against a threshold value to determine access. In one embodiment, threshold value can be established within settings 328. In the instance, threshold can include a numeric value, an alphanumeric value, and the like. For example, threshold can be set to medium filtering which can allow a user D to contact a recipient (user A) when the endorsement value is greater than 50% (e.g., 93%).

Computing device 360 can be a hardware/software permitting the capture of photograph 368 and/or presentation of content 376. Device 360 can include, but is not limited to, camera 362, input/output components 364, user settings, interface 366, and the like. I/O components 364 can include, but is not limited to, a keyboard, a mouse, an accelerometer, an ambient light sensor, and the like. Computing device 360 can include, but is not limited to, a desktop computer, a laptop computer, a tablet computing device, a personal digital assistant (PDA), a mobile phone, and the like. Interface 366 can be a user interactive component permitting interaction with camera 362 functionality and/or content 376. Interface 366 capabilities can include a graphical user interface (GUI), voice user interface (VUI), mixed-mode interface, and the like. For example, interface 366 can be a Web browser or a mobile application interface. In one instance, interface 336 can be communicatively linked to computing device 360.

Repository 370 can be a hardware/software entity for persisting and/or providing access to user profile 372, digital media 374, and/or content 376. Repository 370 can include, but is not limited to, user profile 372, digital media 374, content 376, a data store, security settings, and the like. In one instance, repository 370 can be a distributed networked computing storage. For example, repository 370 can be a cloud storage server able to persist photographs owned by a user (e.g., or recipient). User profile 372 can be a data set associated with a user and/or a user identity of a computing system such as a social network. Profile 372 can include a user identity, a set of user preferences, user data, digital media, and the like. In one instance, profile 327 can be associated with a user account, a device (e.g., via a unique device identifier), and the like. Digital media 374 can conform to traditional and/or proprietary formats including, but not limited to, Joint Photographers Expert Group (JPEG), Motion Picture Experts Group (MPEG), Portable Network Graphics (PNG), Graphics Interchange Format (GIF), Audio Video Interleave (AVI), and the like.

It should be appreciated that the disclosure is not limited to a social network platform and/or a social media platform. In one instance, the disclosure can be a functionality of a messaging application executing on a computing device. For example, disclosure can be a functionality of a mobile phone mobile messaging application.

The flowchart and block diagrams in the FIGS. 1A-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for communication and/or content access comprising:
   detecting a social media action initiated within a social networking platform, wherein the social media action is performed by a first computing device of a first user attempting to interact with a second computing device of a second user;
   conveying a facial biometric identification challenge to the first computing device prior to initiating the social media action, wherein the conveying triggers the capture of a digital self-portrait photograph of the first user by the first computing device;
   determining a user identity of the first user utilizing facial biometrics obtained from the digital self-portrait photograph by comparing a facial biometric of the face of the first user within the digital self-portrait photograph to facial features of human faces within historic digital media images; and
   when a previously established endorsement value associated with the user identity is greater than a historically determined threshold value, completing the social media action;
   wherein the endorsement value is based on at least one endorsement factor, wherein the endorsement factor is at least one of a frequency of presence of the first user in a set of historic digital media images of the second user or the quantity of shared historic digital media images between the first and second user or a frequency of presence of the first and second user within the set of historical digital media images;
   wherein the completing the social media action enables an interaction between the first and the second user;
   wherein the completing the social media action enables the first user to access digital content associated with the second computing device of the second user by conveying digital content associated with a content access request from the second computing device to the first computing device; and
   when detecting the first user is not present within the set of historic media images, disallowing communication between the first and second user by conveying a notification indicating a denial of the content access request to the first computing device.

2. The method of claim 1, wherein the facial biometric identifies the first user associated with a user account of a social media computing system managing the social media interaction.

3. The method of claim 1, further comprising:
   establishing a weighted value for the frequency of presence of the first user.

4. The method of claim 1, wherein the content access request is associated with a social media digital content of a social media computing system within which the first and the second users have social networking accounts, wherein the interaction between the first and the second user is facilitated by the social media computing system.

5. The method of claim 1, wherein the endorsement factor is the frequency of presence of the first user in the set of historic digital media images of the second user.

6. The method of claim 1, wherein the endorsement factor is the quantity of shared historic digital media images between the first and second user.

7. The method of claim 1, wherein the endorsement factor is a frequency of presence of the first and second user within the set of historical digital media images.

8. The method of claim 1, wherein the social media action is one of a message exchange, a video conference, and a profile view, wherein the social media action is facilitated by a social media computing system within which both the first and second users have user specific accounts.

9. The method of claim 1, wherein the method is performed at least in part by a mobile application running on the first computing device.

10. A system, comprising hardware, for communication and/or content access comprising:
    at least one processor;
    a non-transitory storage medium storing a set of programmatic instructions executed by the at least one processor causing the system to:
    detect a social media action initiated within a social networking platform, wherein the social media action is performed by a first computing device of a first user attempting to interact with a second computing device of a second user;
    convey a facial biometric identification challenge to the first computing device prior to initiating the social media action, wherein the conveying triggers the capture of a digital self-portrait photograph of the first user by the first computing device;
    determine a user identity of the first user utilizing facial biometrics obtained from the digital self-portrait photograph by comparing a facial biometric of the face of the user within the digital self-portrait photograph to facial features of human faces within historic digital media images;
    when a previously established endorsement value associated with the user identity is greater than a historically determined threshold value, complete the social media action;
    wherein the endorsement value is based on at least one endorsement factor, wherein the endorsement factor is at least one of a frequency of presence of the first user in a set of historic digital media images of the second user or the quantity of shared historic digital media images between the first and second user or a frequency of presence of the first and second user within the set of historical digital media images;

wherein completing the social media action enables an interaction between the first and the second user;

wherein the completing the social media action enables the first user to access digital content associated with the second computing device of the second user by conveying digital content associated with a content access request from the second computing device to the first computing device; and when detecting the first user is not present within the set of historic media images, disallow communication between the first and second user by conveying a notification indicating a denial of the content access request to the first computing device.

11. The system of claim 10, further comprising:

a facial recognition component, comprising as least a portion of the programmatic instructions, configured to analyze the digital self-portrait photograph of the face of the first user to determine the user identity;

a list manager, comprising as least a portion of the programmatic instructions, configured to generate an endorsement list for the set of historic digital media images; and a device manager, comprising as least a portion of the programmatic instructions, configured to associate the first and second users with the first and second computing devices.

12. The system of claim 10, wherein functionality of the system is a capability provided at least in part by a mobile application executing on a mobile device, which is the first computing device.

13. The system of claim 10, wherein the communication between the first and second user is associated a social network platform within which the first user and the second user both have user specific accounts, wherein the social media action is an action managed by the social network platform.

14. The system of claim 10, wherein the endorsement factor is the frequency of presence of the first user in a set of historic digital media images of the second user.

15. The system of claim 10, wherein the communication is a social media action is one of at least one of a message exchange, a video conference, and a profile view.

* * * * *